Jan. 17, 1933.                H. JACQUÉ                    1,894,467
            PRODUCTION OF FOILS AND APPARATUS THEREFOR
                    Filed Sept. 25, 1930       4 Sheets-Sheet 1

Heinrich Jacqué.
INVENTOR
BY ATTORNEYS

Jan. 17, 1933.   H. JACQUÉ   1,894,467
PRODUCTION OF FOILS AND APPARATUS THEREFOR
Filed Sept. 25, 1930   4 Sheets-Sheet 2

Heinrich Jacqué.
INVENTOR
BY ATTORNEYS

Jan. 17, 1933.  H. JACQUÉ  1,894,467
PRODUCTION OF FOILS AND APPARATUS THEREFOR
Filed Sept. 25, 1930  4 Sheets-Sheet 3

Heinrich Jacqué.
INVENTOR

BY ATTORNEYS

Jan. 17, 1933. H. JACQUÉ 1,894,467
PRODUCTION OF FOILS AND APPARATUS THEREFOR
Filed Sept. 25, 1930 4 Sheets-Sheet 4

Heinrich Jacqué.
INVENTOR

BY ATTORNEYS

Patented Jan. 17, 1933

1,894,467

UNITED STATES PATENT OFFICE

HEINRICH JACQUÉ, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

PRODUCTION OF FOILS AND APPARATUS THEREFOR

Application filed September 25, 1930, Serial No. 484,463, and in Germany September 26, 1929.

The present invention relates to the production of foils and apparatus therefor.

I have found that foils of any desired thickness, especially those of colloids which are capable of being hardened, can be prepared in a very advantageous and simple manner without the solid stationary or moving flat substrata hitherto necessary in the production of foils for providing a table-like surface onto which to pour the colloids and thus while avoiding the drawbacks occurring thereby, by causing a liquefied film-forming substance, i. e. such substance liquefied by heat or dissolution, to flow onto two conveyor belts, which are running at an angle to each other and in the same direction and at the same speed, in the neighbourhood of the vertex of the angle formed by the two said conveyor bands. The foil or film which is continuously produced on the surface of both the bands and in the gradually increasing space between the bands may be caused to pass over two further conveyor bands which are parallel or nearly parallel to each other and which are moving, preferably downwards, and then the film may be subjected to a finishing treatment, such as drying, vulcanizing or hardening.

The nature of the invention will be further described with reference to the accompanying diagrammatic drawings which show arrangements of apparatus according to this invention, but the invention is not restricted to these arrangements.

Figure 1:
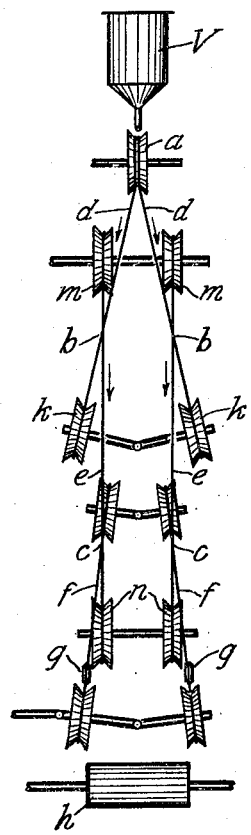
Figure 2:
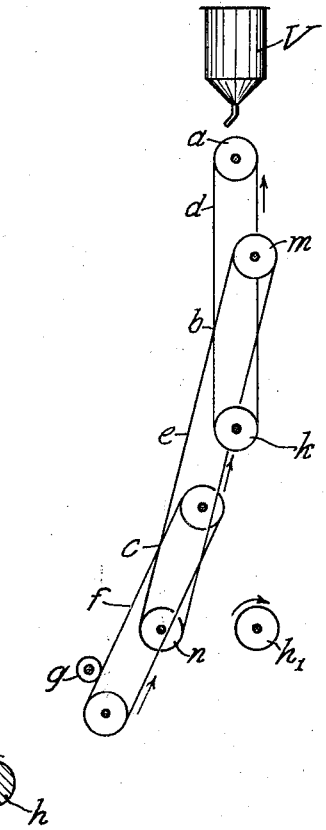

In Figure 1 which is a front view of a device according to the present invention a vessel V having an outflow at its bottom is arranged above a pulley $a$ and a pair of parallel pulleys $k$, which are arranged at some distance from the said pulley $a$ and, preferably, at the same level to each other, two endless belts $d$ such as wires or bands being extended over the said pulleys so that said endless belts can be moved in the same direction if the pulley $a$ be rotated alone or conjointly with the pulleys $k$ by any suitable device such as a motor of any kind which is not shown for the sake of clearness. If the belts are rather strained no special device must be provided for rotating the pulleys $k$ which are then taken along by friction by the belts, but in most cases it will be more advantageous to couple the shaft of the pulleys $k$ with the shaft of the pulley $a$ in any usual convenient manner, for example by transmission pulleys, so as to rotate all the pulleys at the same speed. At some distance in the rear of and at a level between the shafts of the pulleys $a$ and $k$ is arranged a further pair of parallel pulleys $m$ which coincide with another pair of pulleys $n$ over which pulleys belts $e$ are spun so as to run parallel and in the same direction and in the direction of the aforesaid belts $d$; these pairs of pulleys $m$ and $n$ are provided with means (not shown) to rotate them all in the same direction and at the same speed. The belts $e$ cross the belts $d$ from the rear at $b$. This second arrangement of pulleys and endless belts is repeated with the belts $f$ which cross the belts $e$ from the rear and at $c$. At the surface of the belts $f$ and below the pulleys $n$ circular knives $g$ art provided and a collecting roller $h$ is provided either below the last mentioned pair of belts $f$, as shown in Figure 1, or in front, or in the rear of them as shown in Figure 2, which is a side view of the device shown in Figure 1. The manner of working with this device will be illustrated as follows:

Referring to Figure 1 which is a front view (of which Figure 2 is the corresponding side view), a viscous solution of a film-forming substance is allowed to flow from the vessel V onto the pulley $a$ on which coincide the two endless belts $d$ constructed of material suitable for the purpose as for example metal, such as nickel, or celluloid, leather and the like, which are driven by the two further pulleys. The solution is drawn apart into a uniformly widening and, in consequence of the evaporation of the solvent, gradually drying film by the bands $d$ which are moving downwards, the distance between which bands increases with the direction of their progression. The film continues moving downwards until it has attained the desired width at the point $b$ where the bands $d$ are intersected by parallel bands which are driven obliquely by means of appropriately arranged pulleys $m$ and $n$, as can be more readily seen from Figure 2. The film is here transferred onto the bands e and as it continues to travel downwards it may be subjected to the finishing treatment, as for example complete drying, vulcanizing or hardening.

By such a treatment, an extension of the film frequently takes place. In order to avoid the irregularities in the finished film caused by this drawback, it has been found preferable to pass the film from the parallel bands e at the point c onto the two conveyor bands f moving downwards more quickly than the bands e, in order to stretch it, the finishing treatment being performed in these conveyor bands f. By the greater velocity of the bands f, which velocity may be regulated according to the nature of the downwardly moving film, the stretching necessary for the production of a smooth film can thus be ensured. In order, in cases when it is necessary, to effect an extension of the width of the film, it is advantageous that the bands f be arranged, not parallel, but somewhat wider apart at the bottom than at the top as shown in Figure 1. The finished film may be taken from the bands f by means of a roller h, if desired with the assistance of a suitable device, as for example a circular knife g. The smoothing treatment may be repeated as many times as desired by arranging several of the stretching devices of the kind described one behind another. With the apparatus described films may be produced for example from a polymerization product of a diolefine. Thus for example a 26.6 per cent solution of a polymerization product of butadiene in cyclohexane may be fed from the vessel V and the film formed may be treated, when on the bands e for example, with sulphur chloride.

Figure 3:
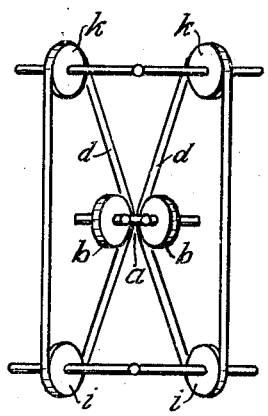
Figure 4:
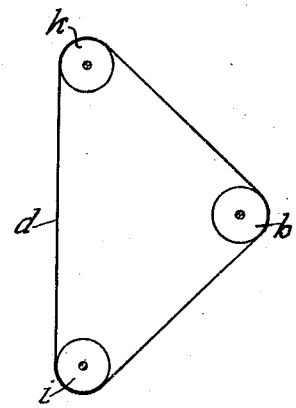
Figure 5:
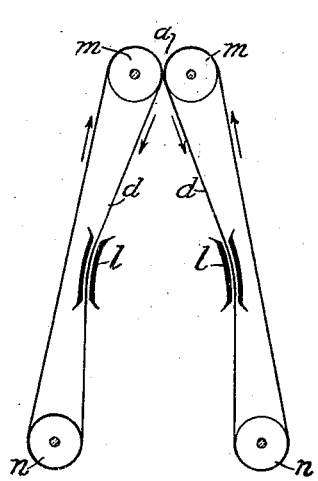
Figure 6:
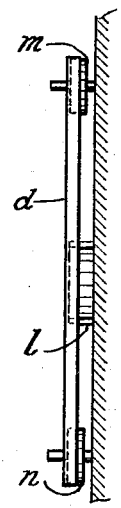

Figures 3 and 5 (and also the corresponding side views, Figures 4 and 6) illustrate an arrangement of apparatus which is a simplification of the arrangement shown in Figure 1 in so far as the conveyor bands d between which the solution or the film during its formation, is to be drawn apart to the desired width also serve for the development or final shaping of the film, so that only one pair of conveyor bands is necessary. The direction of the bands d, running over the pulleys b, is deflected from these pulleys near the point of coincidence a (where the solution is supplied), at first into an angular and then into a parallel or nearly parallel direction by pairs of pulleys i and k in the arrangement shown in Figures 3 and 4. In Figures 5 and 6 the deflection of the bands from their direct run between the pulleys n and m is effected by a device l (guide bar or roller). Before the film passes round the pairs of pulleys k or n it is removed from the apparatus, whether it be in order to lead it to a stretching device similar to that already described and to subject it to the finishing treatment such as hardening or vulcanization in cases when this has not already been effected or whether it be to transfer it to the rolling apparatus without further treatment. The nozzles which serve for pouring out the solution may be of different shapes; for example they may have round or slit-shaped openings. Several nozzles may also be arranged one above the other or one beside the other. The method of supplying the solution naturally depends especially on the width and thickness of the desired film and on the nature of the solution.

Figures 11, 12:
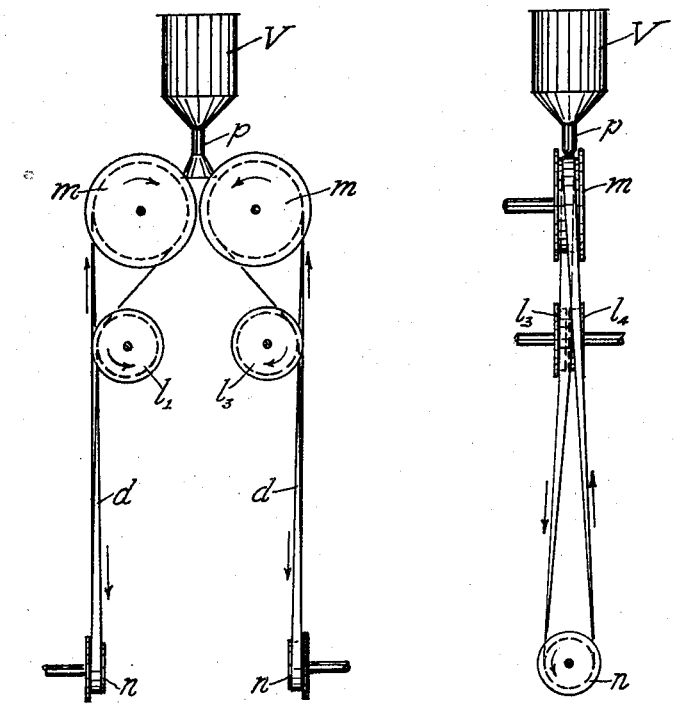
Figures 13, 14:
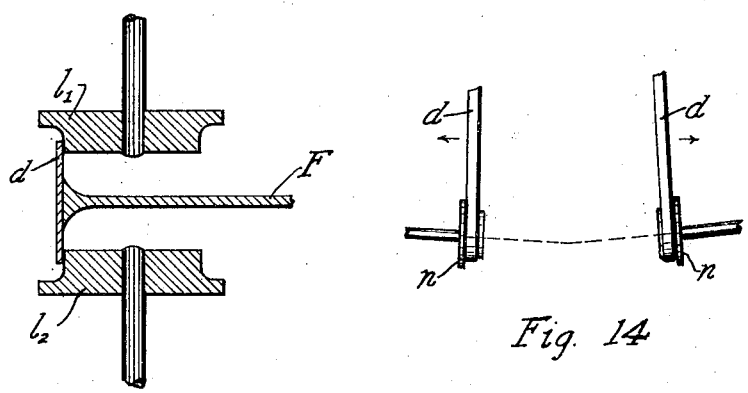

The substitution of the guide bars l shown in Figures 5 and 6 by rollers is shown in Figures 11, 12 and 13 which do not require special explanation, Figure 11 showing the front view of the device, Figure 12 showing its side view from the centre of the device and Figure 13 showing an internal side view of the pairs of rollers $l_1$ and $l_2$, the belt d and a cross section of a film F as seen during operating the device. Between the pulleys m and $l_1$ (and respectively $l_3$) further one or more pairs of pulleys may be arranged with their shafts in parallel to those of the said pulleys and in such a manner that the belts d are diverted from their direct way from the pulleys m to the pulleys $l_1$ (and $l_3$ respectively) and the space between the belts on their way from m to $l_1$ (and $l_3$ respectively) is diminished to a more slowly increasing angle with somewhat curved legs.

Figure 7:
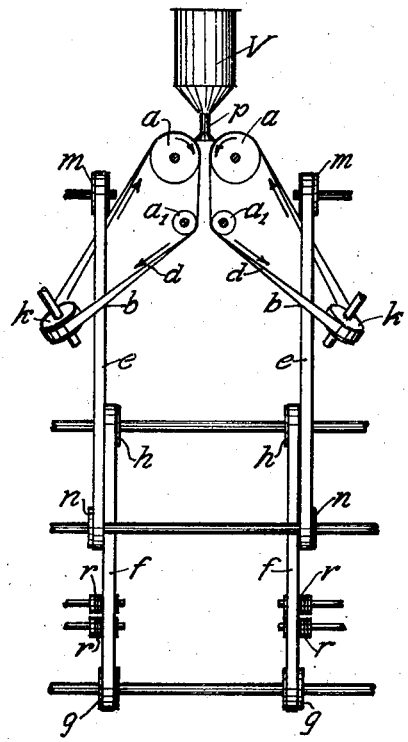
Figure 8:
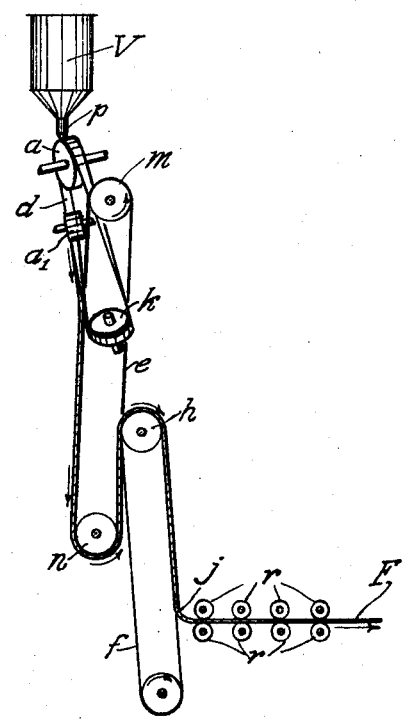
Figures 10, 10A:
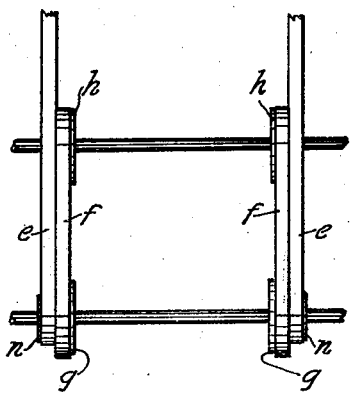
Figure 9:
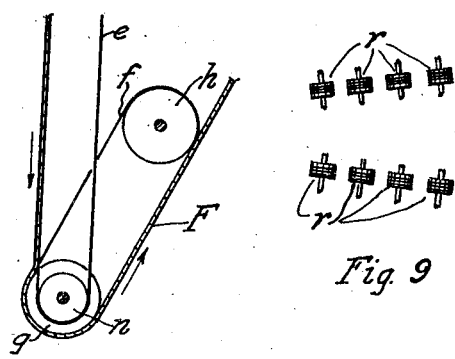

In Figures 7, 8, 9, 10 and 10a modifications of the previously described devices are shown. The vessel V is provided at its bottom with a pipe p having a flat nozzle of a breadth exceeding the diameter of the pipe. It has been found advantageous that a flat nozzle is used the cross section of which is no parallelogram, but the centre of which is a little broader than the corners. The distance between the pulleys a is kept larger than in Figures 3 and 5. Assistant pulleys $a_1$ are arranged parallel to and below the pulleys a and pulleys k are arranged at some distance outward the pulleys a and $a_1$ the shaft of which pulleys k is inclined to those of the pulleys a and $a_1$ in such a manner that it is vertical to those of the pulleys a and $a_1$ and that its top is deflected from the said pulleys. Consequently the endless belts d spun over the pulleys a, $a_1$ and k are in parallel at the space between the pulleys a and $a_1$ and deflected at the pulley k. Above the pulleys k another pair of pulleys m are arranged which coincide with further pulleys n, so that endless belts e spun on these latter pulleys pass through the triangle formed by the belts d and touch the inner surface at the front portion of said belts d. Between and in parallel to said bands e further bands f may be arranged on pulleys g and h, which may protrude from the belts e, for example as shown in Figures 10 and 10a by arranging the pulleys g on the shafts of the pulleys n and providing the pulleys g with a diameter greater than that of the pulleys n. Instead of the roller h and of the belt f a series of rollers r as shown in Figures 7 and 8 may be arranged through which the foil F formed on operating the device may be extruded and which may be diverted as shown in Figure 9 in order to extrude such foil in its breadth. If desired, the endless belts f may be arranged in the rear of the belts e as shown in Figure 8. On operating this device a viscous solution of a film-forming substance or such substance in the liquid state is poured through the pipe and nozzle p onto the belts d before they leave the pulleys a; the solution or substance then forms a thick foil between the belts which foil is extruded as soon as the belts divert from each other. The foil is then taken off by the belts e moving in the same direction as the belts d. The foil F is then transferred to the belts f, running in the same direction as, and preferably at a higher speed than, the belts e and finally passed through the rollers r which may provide a final extruding in length and/or breadth of the foil. If desired several pairs of belts may be arranged instead of the single pair e and the points at which the foils pass from one pair of the belts to another pair may be varied. In all cases of working with belts it is advantageous to slightly distort the shafts of the pulleys as shown in Figure 14 in order to prevent the belts from sliding off the pulleys.

By the process according to the present invention films may be prapared from solutions of any colloids, which are capable of being hardened, as for example from polymerization products of hydrocarbons of the butadiene series or of vinyl compounds, from synthetic resins prepared by condensation of aromatic dicarboxylic acids with polyhydric alcohols and the like materials.

Thus for example a viscous solution obtained by heating 8 parts of purified crepe rubber in a stirring autoclave for about 5 hours to 190° C. together with 30 parts of cyclohexane and having such a high viscosity that a steel ball of 2 millimetres diameter falls 10 centimetres per 50 minutes in the said solution is poured from the vessel V through the pipe p onto the belts d as shown in Figure 11, the belts being kept at a speed of 20 metres per hour. A foil of 0.02 millimetre thickness and of 50 centimetres breadth is obtained if the belts are arranged at this distance between the pulleys n. The foil is hardened by passing it before leaving the belts through a space the atmosphere of which is kept at about 100° C. and is saturated with vapours of sulphur chloride. In the same manner foils from gelatine can be prepared by substituting an aqueous solution from equal parts of gelatine and of hot water and then cooled to 35° C. for the aforesaid solution of rubber, the stretching operation being carried out at about 20° C.

What I claim is:—

1. Apparatus for the production of foils from liquefied film-forming substances comprising, in combination, a pair of pulleys, said pulleys having substantially parallel shafts and being arranged at a substantial distance from each other and from at least one further pulley, a pair of endless belts each extended over one pulley of said pair and over said further pulley, said belts being almost in contact with each other on said further pulley, means for rotating said pulleys, thereby conveying said belts in substantially the same direction, and means for supplying liquid to said belts at the point where they are almost in contact with each other.

2. Apparatus for the production of foils from liquefied film-forming substances comprising, in combination, a pair of pulleys, said pulleys having substantially parallel shafts and being arranged at a substantial distance from each other and from at least one further pulley, a pair of endless belts each extended over one pulley of said pair and over said further pulley, said belts being almost in contact with each other on said further pulley, two further pairs of pulleys, the pulleys of each pair having substantially parallel shafts and being arranged at a substantial distance from each other which distance is smaller than the distance of the pulleys of the first-mentioned pair from each other, two further endless belts, each extended over one pulley of each of said further pairs of pulleys, said further belts forming a plane passing at an angle through the plane formed by said pair of belts, means for rotating said pulleys, thereby conveying all of said belts in substantially the same direction, and means for supplying liquid to said pair of belts at the point where they are almost in contact with each other.

3. Apparatus for the production of foils from liquefied film-forming substances comprising, in combination, a pair of pulleys, said pulleys having substantially parallel shafts and being arranged at a substantial distance from each other and from at least one further pulley, a pair of endless belts each extended over one pulley of said pair and over said further pulley, said belts being almost in contact with each other on said further pulley, two further pairs of pulleys, the pulleys of each pair having substantially parallel shafts and being arranged at a substantial distance from each other which distance is smaller than the distance of the pulleys of the first-mentioned pair from each other, two further endless belts, each extended over one pulley of each of said further pairs of pulleys, said further belts forming a plane passing at an angle through the plane formed by said pair of belts, two other pairs of pulleys, the pulleys of each pair having substantially parallel shafts and being arranged at a substantial distance from each other which distance is smaller than the distance of the pulleys of said further pairs from each other, two other endless belts, each extended over one pulley of each of said other pairs of pulleys, said belts forming a plane passing at an angle through the plane formed by said further belts, means for rotating said pulleys, thereby conveying all of said belts in substantially the same direction and means for supplying liquid to said pair of belts at the point where they are almost in contact with each other.

4. Apparatus for the production of foils from liquefied film-forming substances comprising a pair of surfaces positioned along lines converging toward each other similar to the sides of a triangle, means for moving said surfaces in a direction away from the converging end of said surfaces and means for supplying said liquefied substance to said surfaces adjacent the converging end thereof.

5. Apparatus for the production of foils from liquefied film-forming substances comprising a pair of endless belts, sets of pulleys for supporting said belts, said sets of pulleys being arranged so that said belts substantially converge at one end, mean for moving said pulleys and belts and means for supplying said liquefied substance to said belt at the converging end thereof.

6. In an apparatus as claimed in claim 1, a plurality of pairs of pulleys, a pair of endless belts each extended over one pulley of each of said pairs, the shafts of each pair of said pulleys being slightly distorted so that the axes of each pair of said shafts form an angle slightly below 180°, the vertex of said angle lying in a direction opposite to that of the pull on said pulleys by said belts when moving.

In testimony whereof I have hereunto set my hand.

HEINRICH JACQUÉ.